United States Patent
Gekht et al.

(10) Patent No.: US 9,850,758 B2
(45) Date of Patent: Dec. 26, 2017

(54) APEX AND FACE SEALS WITH ROTARY INTERNAL COMBUSTION ENGINE

(71) Applicant: Pratt & Whitney Canada Corp., Longueuil (CA)

(72) Inventors: Eugene Gekht, Brossard (CA); Jean Thomassin, Ste-Julie (CA); Sebastien Bolduc, Longueuil (CA); David Gagnon-Martin, Longueuil (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 236 days.

(21) Appl. No.: 14/606,182

(22) Filed: Jan. 27, 2015

(65) Prior Publication Data

US 2015/0167465 A1 Jun. 18, 2015

Related U.S. Application Data

(62) Division of application No. 13/273,824, filed on Oct. 14, 2011, now Pat. No. 8,967,988.

(60) Provisional application No. 61/512,457, filed on Jul. 28, 2011.

(51) Int. Cl.

| F01C 1/22 | (2006.01) |
|---|---|
| F16J 15/54 | (2006.01) |
| F01C 19/04 | (2006.01) |
| F01C 19/08 | (2006.01) |
| F01C 21/08 | (2006.01) |
| F01C 19/10 | (2006.01) |

(52) U.S. Cl.
CPC .......... *F01C 1/22* (2013.01); *F01C 19/04* (2013.01); *F01C 19/08* (2013.01); *F01C 19/10* (2013.01); *F01C 21/08* (2013.01); *F16J 15/545* (2013.01)

(58) Field of Classification Search
CPC .. F01C 1/22; F01C 19/10; F01C 21/08; F01C 19/08; F01C 19/04; F16J 15/545
USPC ............................................ 418/113; 11/113
See application file for complete search history.

(56) References Cited

U.S. PATENT DOCUMENTS

| 2,979,042 A | 4/1961 | Bentele |
| 3,033,180 A | 5/1962 | Bentele |
| 3,064,880 A | 11/1962 | Wankel et al. |
| 3,102,518 A * | 9/1963 | Anderson ............... F01C 19/10 |
| | | 277/357 |
| 3,102,520 A | 9/1963 | Schlör |
| 3,113,526 A | 12/1963 | Paschke |
| 3,127,095 A | 3/1964 | Froede |
| 3,130,900 A | 4/1964 | Schlör |
| 3,131,945 A | 5/1964 | Scherenberg et al. |
| 3,134,537 A | 5/1964 | Bentele et al. |

(Continued)

FOREIGN PATENT DOCUMENTS

EP 2497902 9/2012

*Primary Examiner* — Patrick Maines
(74) *Attorney, Agent, or Firm* — Norton Rose Fulbright Canada

(57) ABSTRACT

A rotor for a rotary internal combustion engine with a first face seal biased axially outwardly away from the first end face has opposed curled ends abutting a first end seal of a respective one of the adjacent apex portions, and a second face seal biased axially outwardly away from the second end face has opposed curled ends abutting a second end seal of a respective one of the adjacent apex portions. A rotary internal combustion engine and a method of sealing chambers of a Wankel engine are also discussed.

13 Claims, 7 Drawing Sheets

(56) References Cited

U.S. PATENT DOCUMENTS

| | | |
|---|---|---|
| 3,139,233 A | 6/1964 | Simonsen |
| 3,142,439 A | 7/1964 | Froede |
| 3,142,440 A | 7/1964 | Schägg |
| 3,180,561 A | 4/1965 | Paschke |
| 3,180,562 A | 4/1965 | Bentele |
| 3,180,563 A | 4/1965 | Jones et al. |
| 3,185,387 A | 5/1965 | Paschke |
| 3,193,188 A | 7/1965 | Bentele |
| 3,193,189 A | 7/1965 | Rastogi |
| 3,196,849 A | 7/1965 | Paschke |
| 3,197,125 A | 7/1965 | Bachman et al. |
| 3,205,872 A | 9/1965 | Pomasanow |
| 3,245,386 A | 4/1966 | Bentele |
| 3,246,636 A | 4/1966 | Bentele |
| 3,261,542 A | 7/1966 | Jones |
| 3,269,369 A | 8/1966 | Ehrhardt |
| 3,269,370 A | 8/1966 | Paschke et al. |
| 3,300,124 A | 1/1967 | Jones |
| 3,301,232 A | 1/1967 | Eickmann |
| 3,674,384 A | 7/1972 | Larrinaga et al. |
| 3,711,229 A | 1/1973 | Kurio |
| 3,758,243 A | 9/1973 | Fox, Jr. |
| 3,761,207 A * | 9/1973 | Seidl .................. F01C 19/10 418/121 |
| 3,764,240 A | 10/1973 | Griffith |
| 3,768,936 A | 10/1973 | McCormick |
| 3,796,527 A | 3/1974 | Woodier et al. |
| 3,802,811 A | 4/1974 | Ruf et al. |
| 3,830,600 A * | 8/1974 | Shimoji ................ F01C 19/10 418/113 |
| 3,834,845 A | 9/1974 | Siler |
| 3,854,456 A | 12/1974 | Ishii et al. |
| 3,861,838 A | 1/1975 | Lamm |
| 3,873,249 A | 3/1975 | Rao |
| 3,884,600 A | 5/1975 | Gray |
| 3,891,357 A | 6/1975 | Davis et al. |
| 3,899,272 A | 8/1975 | Pratt |
| 3,930,767 A | 1/1976 | Hart |
| 3,932,075 A | 1/1976 | Jones |
| 3,955,904 A * | 5/1976 | Catterson ............ F01C 19/08 418/121 |
| 3,961,871 A * | 6/1976 | Kurio .................. F01C 19/10 418/121 |
| 3,995,599 A | 12/1976 | Shier |
| 4,012,179 A | 3/1977 | Roberts |
| 4,042,312 A | 8/1977 | Betts |
| 4,047,856 A | 9/1977 | Hoffman |
| 4,056,338 A | 11/1977 | Eiermann |
| 4,059,370 A | 11/1977 | Gibson |
| 4,060,352 A | 11/1977 | Woodier et al. |
| 4,104,011 A | 8/1978 | Ernest |
| 4,116,593 A | 9/1978 | Jones |
| 4,808,096 A * | 2/1989 | Eiermann ............ F01C 19/08 277/357 |
| 5,039,288 A * | 8/1991 | Bando .................. F01C 19/02 418/123 |
| 5,049,051 A * | 9/1991 | Keleher ................ F01C 19/04 418/113 |
| 5,397,224 A * | 3/1995 | Bando .................. F01C 19/08 277/357 |
| 7,097,436 B2 | 8/2006 | Wells |
| 7,275,919 B2 | 10/2007 | Atkins |
| 7,303,380 B1 | 12/2007 | Atkins |
| 2007/0065330 A1* | 3/2007 | Wallack ................ C22C 38/44 420/95 |
| 2007/0189914 A1* | 8/2007 | Atkins .................. F01C 19/04 418/250 |
| 2012/0227397 A1 | 9/2012 | Willi et al. |

* cited by examiner

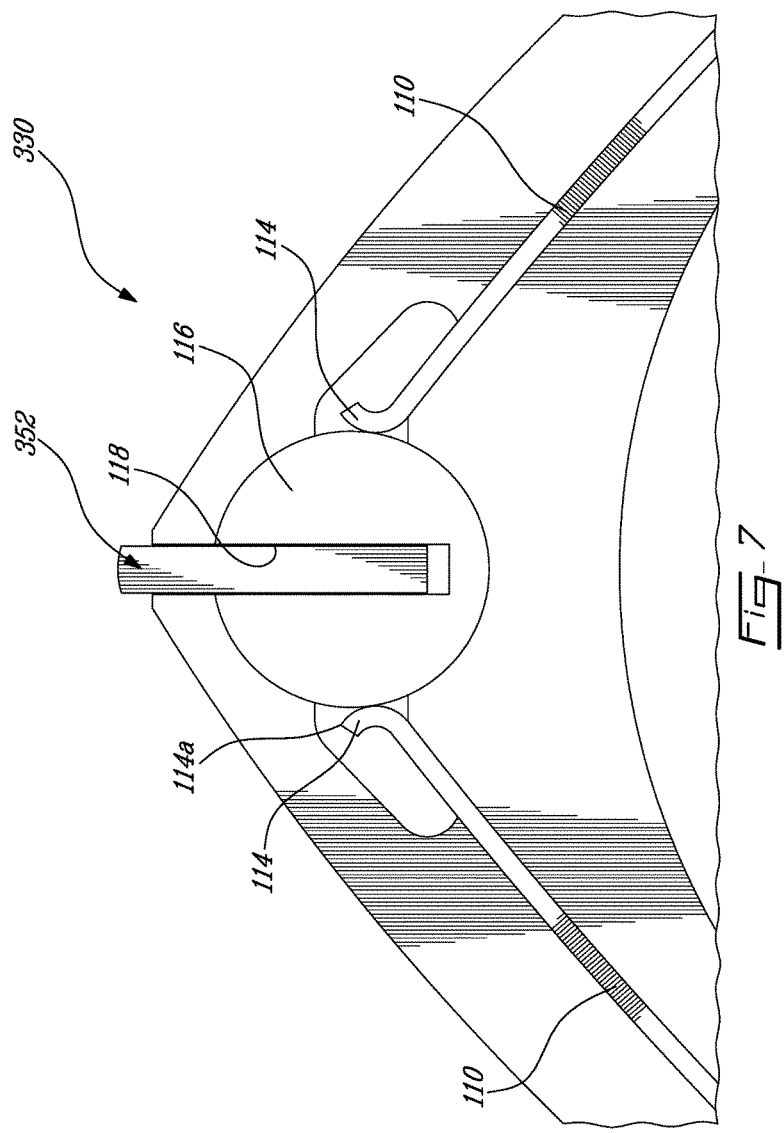

APEX AND FACE SEALS WITH ROTARY INTERNAL COMBUSTION ENGINE

CROSS-REFERENCE TO RELATED APPLICATION

This application is a divisional of U.S. application Ser. No. 13/273,824 filed Oct. 14, 2011, which claims priority on provisional U.S. application No. 61/512,457 filed Jul. 28, 2011, the entire contents of which are incorporated by reference herein.

TECHNICAL FIELD

The application relates generally to an internal combustion engine using a rotary design to convert pressure into a rotating motion, more particularly, to sealing arrangements for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The space around the rotor within the rotor cavity defines a number of working chambers which must be sealed from one another in order for the engine to work efficiently. Prior art sealing arrangements typically have gaps between some of the adjacent seal members, which may be due to manufacturing tolerances and/or differential thermal expansions of the seal elements and rotor.

SUMMARY

In one aspect, there is provided a rotor for a rotary internal combustion engine comprising: a body having first and second axially spaced apart end faces, and a peripheral face extending between the end faces and defining at least three circumferentially spaced apex portions, the first and second end faces each having a groove defined therein between each of the apex portions and each adjacent one of the apex portions, the grooves of the first and second end faces being disposed adjacent to and radially inwardly of the peripheral surface of the rotor; at each of the apex portions: an apex seal protruding radially from the peripheral face of the body and being biased radially away therefrom, and first and second end seals received in a corresponding recess defined in the first and second end face, respectively, the first end seal protruding axially from the first end face and being biased axially outwardly away therefrom, and the second end seal protruding axially from the second end face and being biased axially outwardly away therefrom, the apex seal being engaged with the first and second end seals; a first face seal located in each groove of the first end face and extending between adjacent ones of the apex portions, each first face seal being biased axially outwardly away from the first end face, each first face seal having opposed curled ends each abutting the first end seal of a respective one of the adjacent apex portions; and a second face seal located in each groove of the second end face and extending between adjacent ones of the apex portions, each second face seal being biased axially outwardly away from the second end face, each second face seal having opposed curled ends each abutting the second end seal of a respective one of the adjacent apex portions.

In another aspect, there is provided a rotary internal combustion engine comprising: a stator body having an internal cavity defined by axially spaced apart end walls and an inner surface extending between the end walls, the cavity having an epitrochoid shape defining at least two lobes; a rotor body having two axially spaced apart end faces each extending in proximity of a respective one of the end walls of the stator body, and a peripheral face extending between the end faces and defining a number of circumferentially spaced apex portions which is one more than a number of the lobes of the cavity, the rotor body being engaged to an eccentric shaft to rotate within the cavity with each of the apex portions remaining in proximity of the inner surface of the cavity; at each of the apex portions: an apex seal protruding radially from the peripheral face of the body and being radially biased against the inner surface of the cavity, and first and second end seals received in a corresponding recess defined in the first and second end face, respectively, the first end seal being axially biased against the first end wall, and the second end seal being axially biased against the second end wall, the apex seal being engaged with the first and second end seals; a first face seal extending from each of the apex portions to each adjacent one of the apex portions, each first face seal extending from the first end face adjacent to and radially inwardly of the peripheral surface of the rotor and being axially biased against the first end wall, each first face seal having opposed curled ends each abutting the first end seal of a respective one of the apex portions; and a second face seal extending from each of the apex portions to each adjacent one of the apex portions, each second face seal extending from the second end face adjacent to and radially inwardly of the peripheral surface of the rotor and being axially biased against the second end wall, each second face seal having opposed curled ends each abutting the second end seal of a respective one of the apex portions.

In a further aspect, there is provided a method of sealing chambers of a Wankel engine defined between a rotor cavity and a rotor thereof, the cavity having axially spaced apart first and second end walls and a peripheral wall extending between the end walls, and the rotor having two axially spaced apart first and second end faces and a peripheral face extending between the end faces and defining circumferentially spaced apex portions, the method comprising: at each one of the apex portions, radially pushing at least a portion of an apex seal against the peripheral wall; between each adjacent ones of the apex portions, axially pushing a first face seal extending from the first end face against the first end wall; between each adjacent ones of the apex portions, axially pushing a second face seal extending from the second end face against the second end wall; at each one of the apex portions, axially pushing a first end seal engaged with the apex seal and extending from the first end face against the first end wall, abutting a curled end of an adjacent one of the first face seals with the first end seal, and abutting a curled end of another adjacent one of the first face seals with the first end seal; and at each one of the apex portions, axially pushing a second end seal engaged with the apex seal and extending from the second end face against the second end wall, abutting a curled end of an adjacent one of the second face seals with the end seal, and abutting a curled end of another adjacent one of the second face seals with the second end seal.

DESCRIPTION OF THE DRAWINGS

Reference is now made to the accompanying figures in which:

FIG. 7 is a schematic front view of an apex portion in accordance with another alternate embodiment.

DETAILED DESCRIPTION

Figure 1:
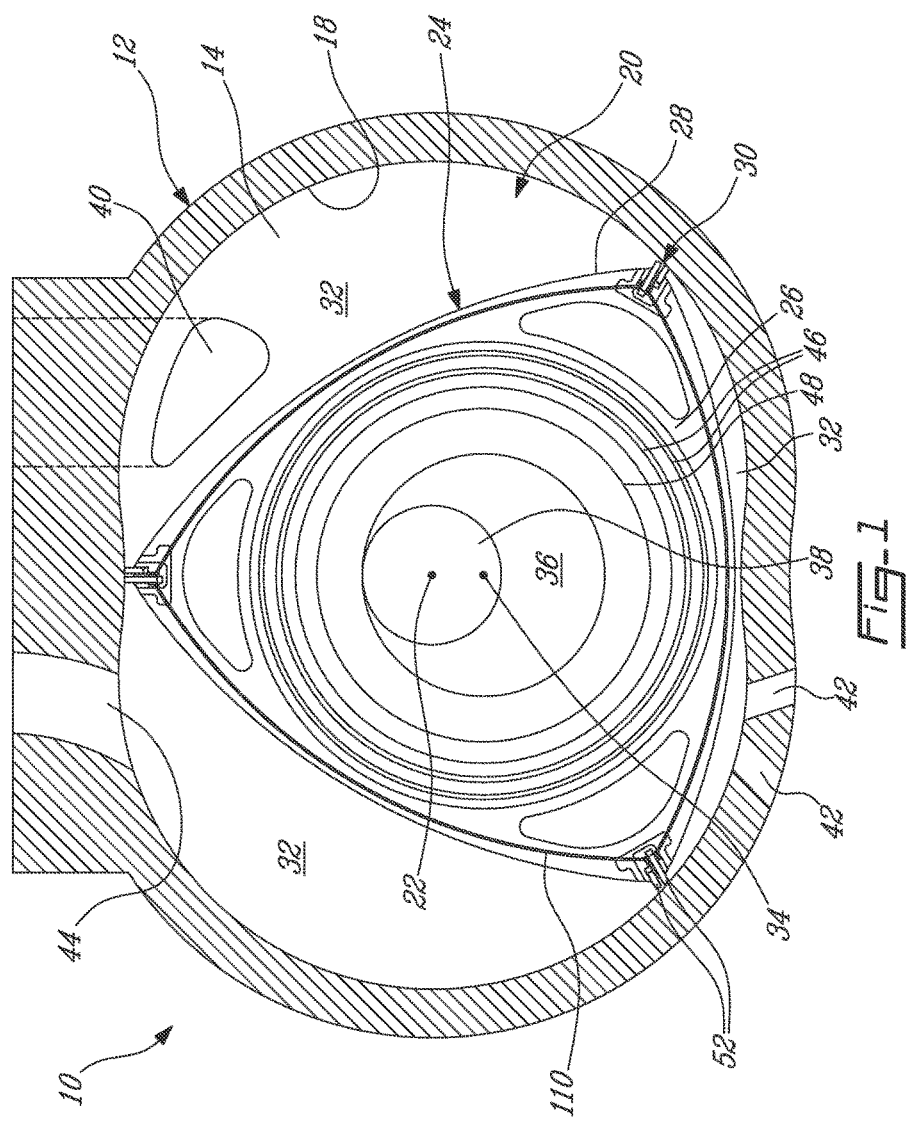
FIG. 1 is a schematic cross-sectional view of a rotary internal combustion engine having a rotor in accordance with one embodiment.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. As will be detailed further below, the apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40 is provided through one of the end walls 14 for admitting air, or air and fuel, into one of the working chambers 32. Passages 42 for a spark plug or other ignition mechanism, as well as for one or more fuel injectors (not shown) are provided through the peripheral wall 18. An exhaust port 44 is also provided through the peripheral wall 18 for discharge of the exhaust gases from the working chambers 32. Alternately, the exhaust port 44 and/or the passages 42 may be provided through the end wall 14, and/or the intake port 40 may be provided through the peripheral wall 18.

During engine operation the working chambers 32 have a cycle of operation including the four phases of intake, compression, expansion and exhaust, these phases being similar to the strokes in a reciprocating-type internal combustion engine having a four-stroke cycle.

At least one oil seal ring 46 is disposed in a circular groove in each end face 26 of the rotor between the bearing 48 for the rotor 24 on the shaft eccentric 36 and the face seals. Each oil seal 46 impedes leakage flow of lubricating oil radially outwardly thereof between the respective rotor end face 26 and outer body end wall 14. Suitable springs (not shown) are provided for urging each oil seal 46 axially into contact with the adjacent end wall 14 of the outer body 12.

Figure 2:
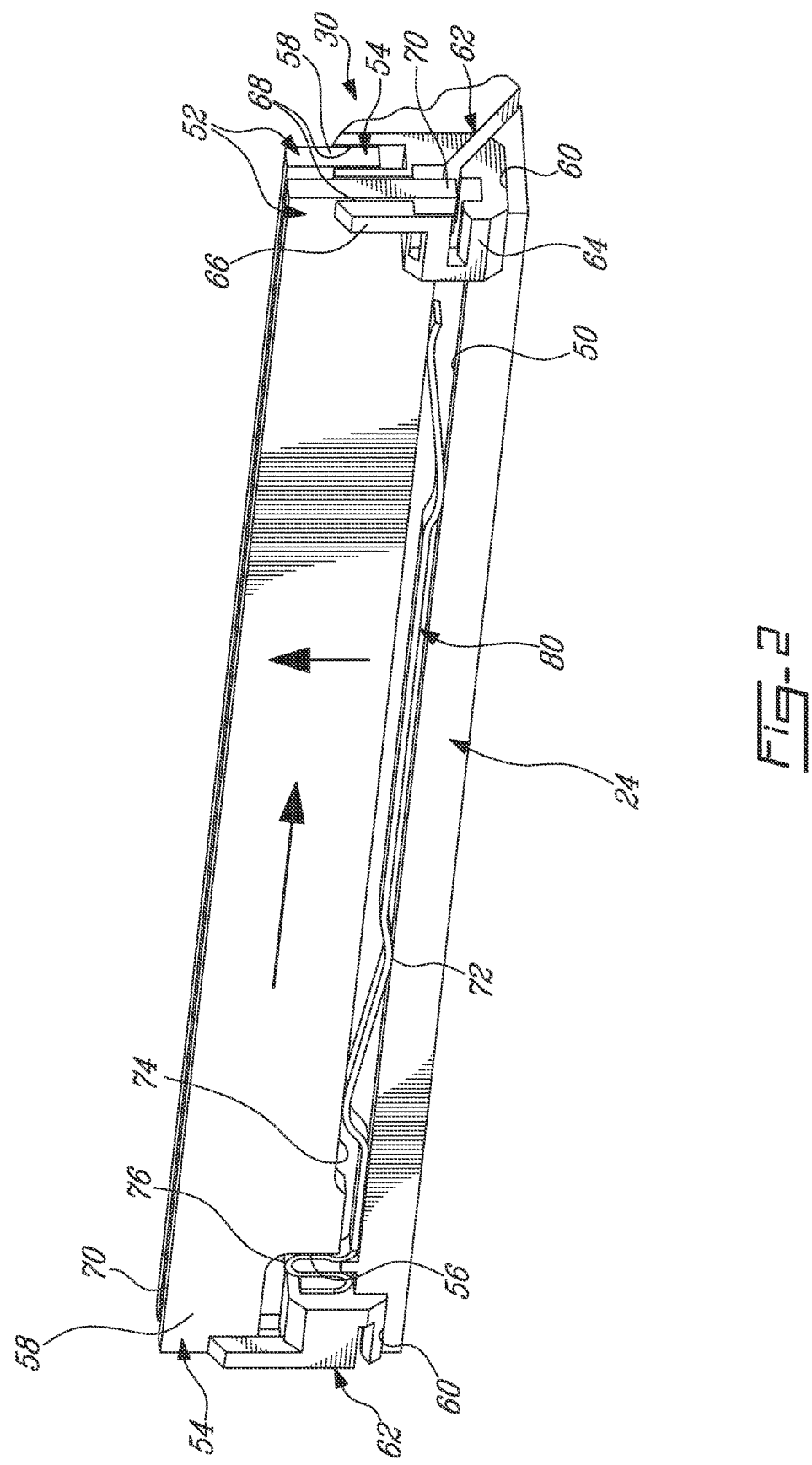
FIG. 2 is a schematic tridimensional view of part of an apex portion of the rotor of the engine of FIG. 1.
Figure 4:
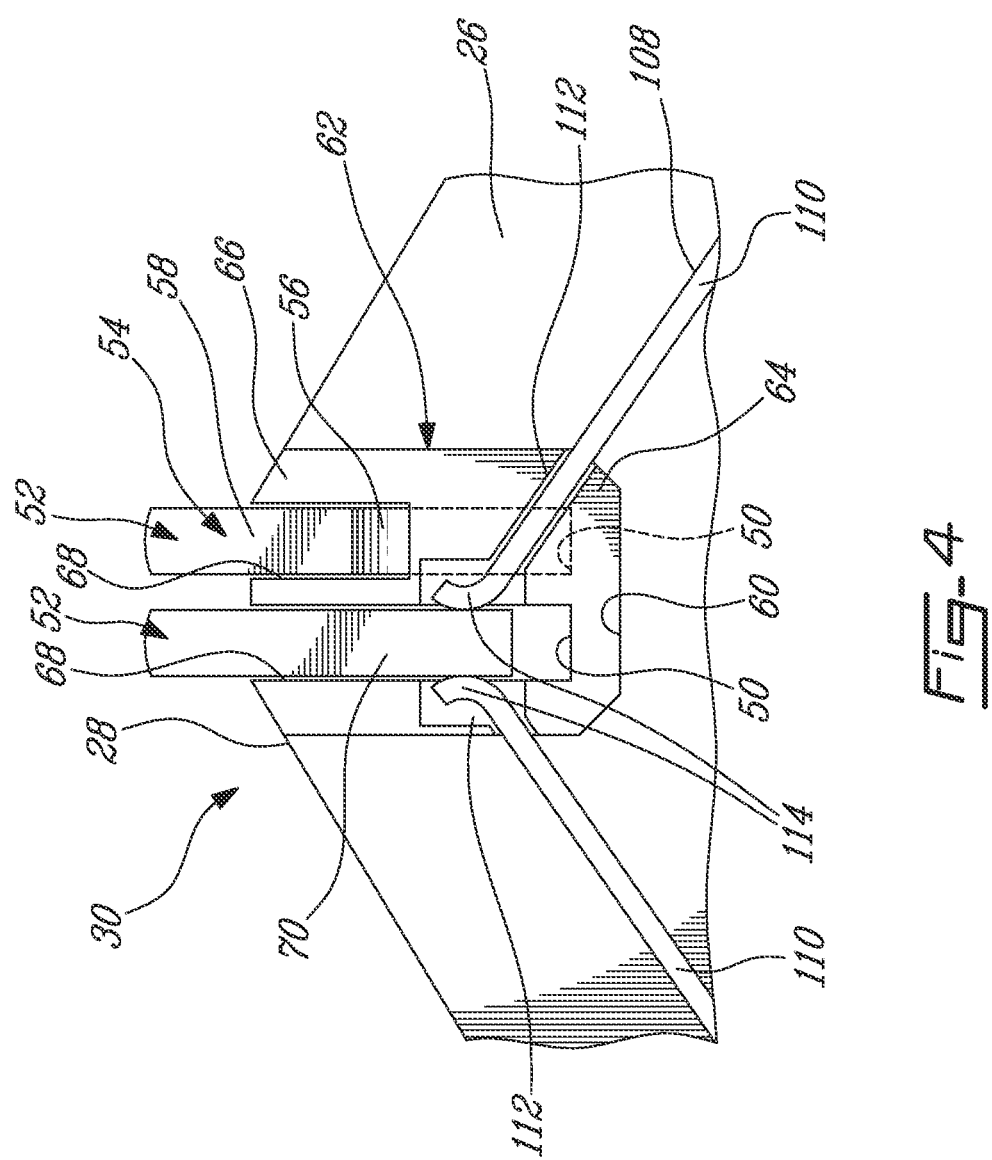
FIG. 4 is a schematic front view of the apex portion of FIG. 2.

The working chambers 32 are sealed by an apex seal assembly and face or gas seals. Referring particularly to FIGS. 2 and 4, each rotor apex portion 30 has two circumferentially spaced apart grooves 50 defined therein and extending radially inwardly into the rotor body 24, one on each side of the apex, from one end face 26 to the other. The apex seal assembly includes an apex seal 52 received within each one of the grooves 50, and protruding radially from the peripheral face 28. Each apex seal 52 in the embodiment shown extends axially beyond both end faces 26, and has an axial dimension which is close to a distance between the two end walls 14 of the cavity 20, taking into consideration such things as the difference in thermal expansion between the material(s) of the outer body 12 and the material of the apex seal 52, which in a particular embodiment is made of a suitable type of ceramic. Although each apex seal 52 is shown has monolithic and including a single seal member, alternately each apex seal may be composed of two or more cooperating seal members.

As shown, each apex seal 52 has a substantially rectangular shape, with a first end 54 having an indentation defined therein from an inner surface thereof. The indentation thus defines a radially extending surface 56 spaced from the first end 54, and the first end defines a finger 58 protruding from that surface 56. The fingers 58 of the two apex seals 52 of the same apex seal assembly are located axially opposite one another.

At each apex portion 30, each end face 26 includes a recess 60 in communication with both grooves 50, and an end plate 62 is received therein and extends radially therefrom. As such, each apex portion 30 includes two axially spaced apart end plates 62. As can be best seen in FIG. 2, each end plate 62 includes a thicker base 64 and a plate member 66 extending radially outwardly from the base 64, with the base 64 and plate member 66 forming a continuous outer surface extending continuously with the corresponding rotor end face 26. Each end plate 62 includes two radial slots 68 defined through the plate member 66 and part of the base 64, each slot 68 being in alignment with a respective one of the grooves 50 (see FIG. 4). Each apex seal 52 has its finger 58 received in the aligned slot 68 of one of the end plates 62, and the opposed second end 70 received in the respective slot 68 of the other end plate 62, such that each of the plates 62 receives one finger 58 and one second end 70. Alternately, the end plates 62 can be replaced by an integral part of the rotor body defining the plate members 66 and slots 68.

Referring to FIG. 2, each groove 50 receives a first biasing member 72, located between the inner surface 74 of the corresponding apex seal 52 and the rotor body 24. The first biasing member 72 pushes the apex seal 52 radially outwardly away from the peripheral face 28 of the rotor 24 and against the peripheral wall 18 of the cavity 20.

Figure 3:
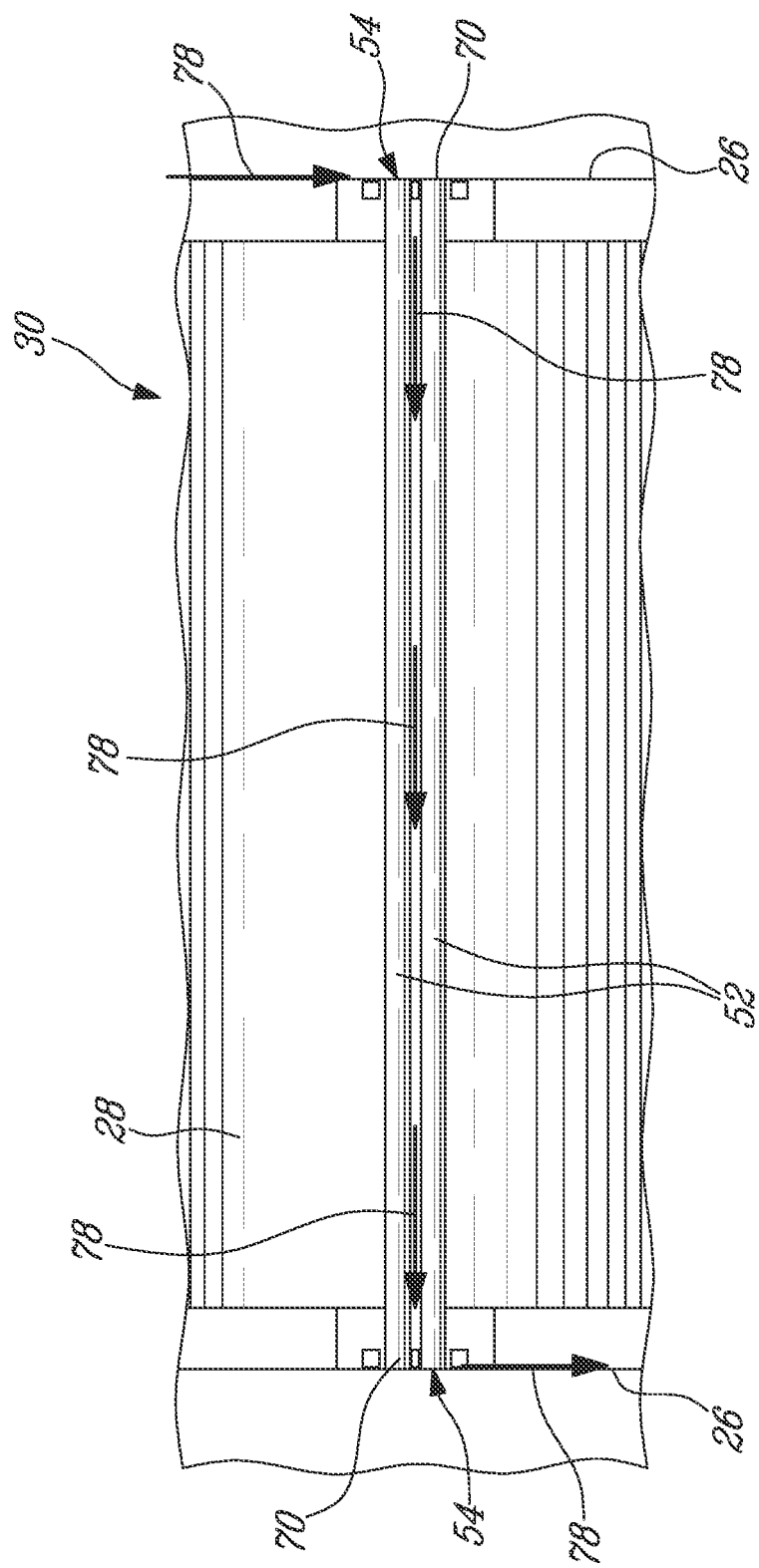
FIG. 3 is a schematic top view of the apex portion of FIG. 2.

Each groove 50 also receives a second biasing member 76 located at the first end 54 of the respective apex seal 52, between the plate member 66 of the adjacent end plate 62 and the radially extending surface 56 defined under the finger 58, pushing the apex seal 52 axially away from that adjacent end plate 62 and thus axially outwardly away from the opposite end face 26 of the rotor 24. The two second biasing members 76 of the same apex seal assembly are in contact with different ones of the end plates 62, and the two apex seals 52 are biased in axially opposite directions, each one against a respective one of the end walls 14. At each apex portion 30, each end wall 14 therefore has one of the apex seals 52 in contact therewith, and the other of the apex seals 52 in close proximity therewith, such as to create a tortuous potential leakage path 78 shown in FIG. 3 which necessitate the escaping flow to travel axially between the two apex seals 52 along the entire apex portion, and as such may help limit fluid communication at the junction between the peripheral wall 18 and each of the end walls 14.

In the embodiment shown, the first and second biasing members 72, 76 for each apex seal 52 correspond to, respectively, a radial action portion and an axial action portion of a same spring 80, the two portions 72, 76 being distinct from one another. Each apex seal 52 is biased independently from the other through its own spring 80.

Figure 5:
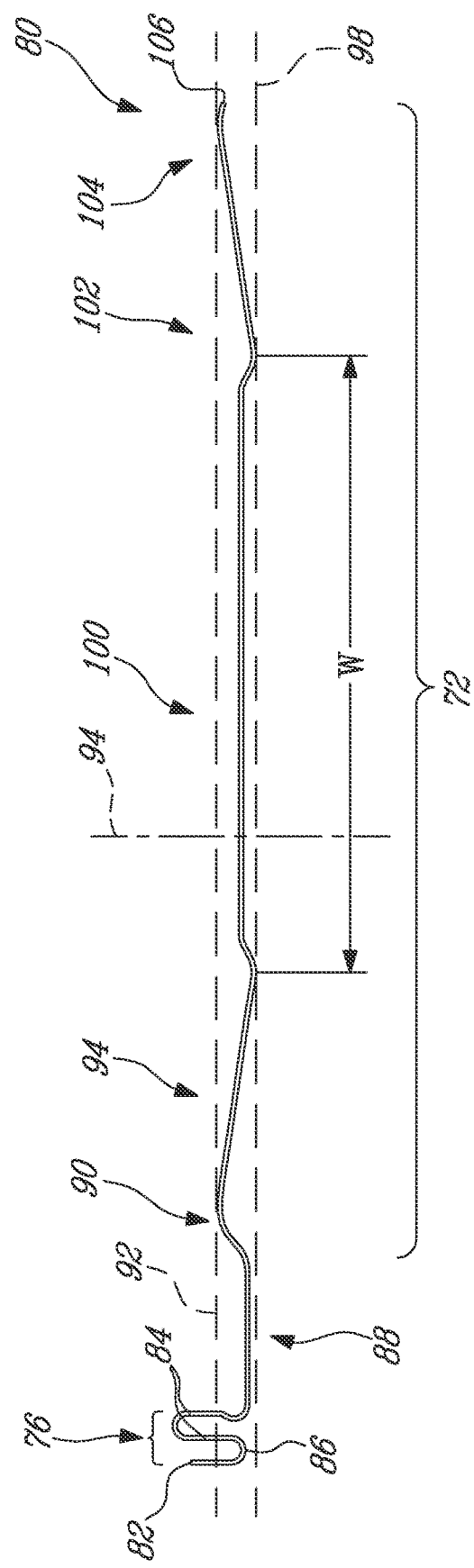
FIG. 5 is a schematic tridimensional view of a spring energizing one of the apex seals of the apex portion of FIG. 2.

Referring to FIG. 5, the spring 80 according to a particular embodiment is shown in isolation. The axial action portion 76 includes a first end 82 of the spring 80 and at least two band sections 84 with adjacent band sections 84 being interconnected by a fold 86. In the embodiment shown, the axial action portion 76 includes three band sections 84. The band sections 84 extend radially and are axially spaced apart from one another. One of the band sections 84 contacts the radially extending surface 56 (see FIG. 2) of the apex seal 52 and another of the band sections 84 contacts a radially extending element of the rotor body, which in the embodiment shown is plate member 66 (see FIG. 2). In a particular embodiment, the axial action portion 76 defines about 5% to 10% of the length of the spring.

The spring 80 is a monolithic band which also includes a longitudinal portion 88 extending axially between the axial action portion 76 and the radial action portion 72. The longitudinal portion 88 is thus connected to the adjacent band section 84 through a fold 86.

The radial action portion 72 forms a major part of the length of the spring 80. The radial action portion 72 contacts the axially extending inner surface 74 of the apex seal 52 (see FIG. 2) in two spaced apart locations, and contacts the bottom surface of the groove 50 between these two locations. In the embodiment shown, the spring includes five successive sections. The first section 90 extends from the longitudinal portion 88 and contacts a first plane 92 defined perpendicularly to the radial direction 94, this first plane 92 corresponding to the inner surface 74 of the apex seal 52. The second section 96 extends from the first section 90 and contacts a second plane 98 parallel to the first plane 92 and radially offset therefrom, which corresponds to the bottom surface of the groove 50. The third section 100 extends axially from the second section 96, and is located between the two planes 92, 98. At least when the spring 80 is in a relaxed state, and in a particular embodiment also when the spring 80 is in a compressed state, the third section 100 extends without contacting the planes 92, 98, i.e. without contacting the apex seal 52 and bottom surface of the groove 50. The fourth section 102 extends from the third section 100 and contacts the second plane 98 or bottom surface of the groove 50. The fifth section 104 extends from the fourth section 102 and contacts the first plane 92 or inner surface 74 of the apex seal 52, and includes the second end 106 of the spring 80.

A distance between the two spaced apart points of contact of the spring 80 with the bottom surface of the groove 50, or between the mid-points of the contact zones if the contact is done along an elongated portion of the surface, defines the wheel base W of the spring. In a particular embodiment, the wheel base W extends along between 55% and 75% of a total length of the radial action portion 72.

In a particular embodiment, the second end 106 of the spring 80 is curved, so that the portions of the spring 80 contacting the apex seal 52 are round to minimize sharp edge contact with the apex seal 52 and as such reduce the risk of damage to the apex seal 52, particularly in cases where the apex seal 52 is made of ceramic. In a particular embodiment, the spring 80 is made of a suitable metal, for example low alloy steel, stainless steel, Ti alloys, and if necessary of a suitable type of super alloy such as, for example, A-286 or Inconell 750.

It can be seen that the axial action portion 76 intersects the first plane 92, in order to extend into the indentation forming the radially extending surface 56 of the apex seal 52.

Referring back to FIG. 4, each end face 26 of the rotor 24 has a plurality of grooves 108 defined therein running from each apex portion 30 to each adjacent apex portion 30, with a face seal 110 being received within each groove 108. In a particular embodiment, each face seal 110 is monolithic. Each end face groove 108 and corresponding face seal 110 are arc-shaped and disposed adjacent to but inwardly of the rotor periphery throughout their length. A spring (not shown) located behind each face seal 110 urges it axially outwardly so that the face seal 110 projects axially away from the adjacent rotor end face 26 into sealing engagement with the adjacent end wall 14 of the cavity.

Each end plate 62 has two openings 112 defined therethrough in continuity with adjacent ones of the grooves 108 of the corresponding end face 26, and each opening 112 receives therein the end of one of the face seals 110. The two ends 114 of each face seal 110 are curled radially outwardly and abut a respective one of the apex seals 52, more particularly the apex seal 52 of each apex seal assembly which is biased against the same one of the end walls 14 as the face seal 110. The ends 114 are curled such as to be able to contact the apex seal 52 without the pointed extremity 114a of the face seal 110 contacting the apex seal 52. The curled ends 114 may reduce the risk of damage to the apex seal 52, particularly in cases where the apex seal 52 is made of ceramic and the face seal 110 is made of metal.

As such, in each apex portion 30, the second end 70 of the apex seal 52 which is biased against a first one of the end walls 14 extends between and is in contact with the curled ends 114 of the two adjacent face seals 110 which are biased against that first end wall 14, and the second end 70 of the apex seal 52 which is biased against the second end wall 14 extends between and is in contact with the curled ends 114 of the two adjacent face seals 110 which are biased against that second end wall 14.

The apex seals 52 limit fluid communication along the peripheral wall 18, and the face seals 110 and apex seals 52 directly cooperate to provide a continuous contact area in sealing engagement with each end wall 14 of the cavity 20. This seal contact area encircles the rotor axis and provides a seal adjacent to the rotor periphery against inward flow of combustion gases between the rotor end faces 26 and the end walls 14. The apex seals 52 and face seals 110 directly cooperate to limit fluid communication along the end walls 14 and near the junction between each end wall 14 and the peripheral wall 18, without the need for an intermediary seal. The elimination of the intermediary seal, seal plug and associated spring may advantageously reduce the number of elements necessary to obtain the desired seal.

Figure 6:
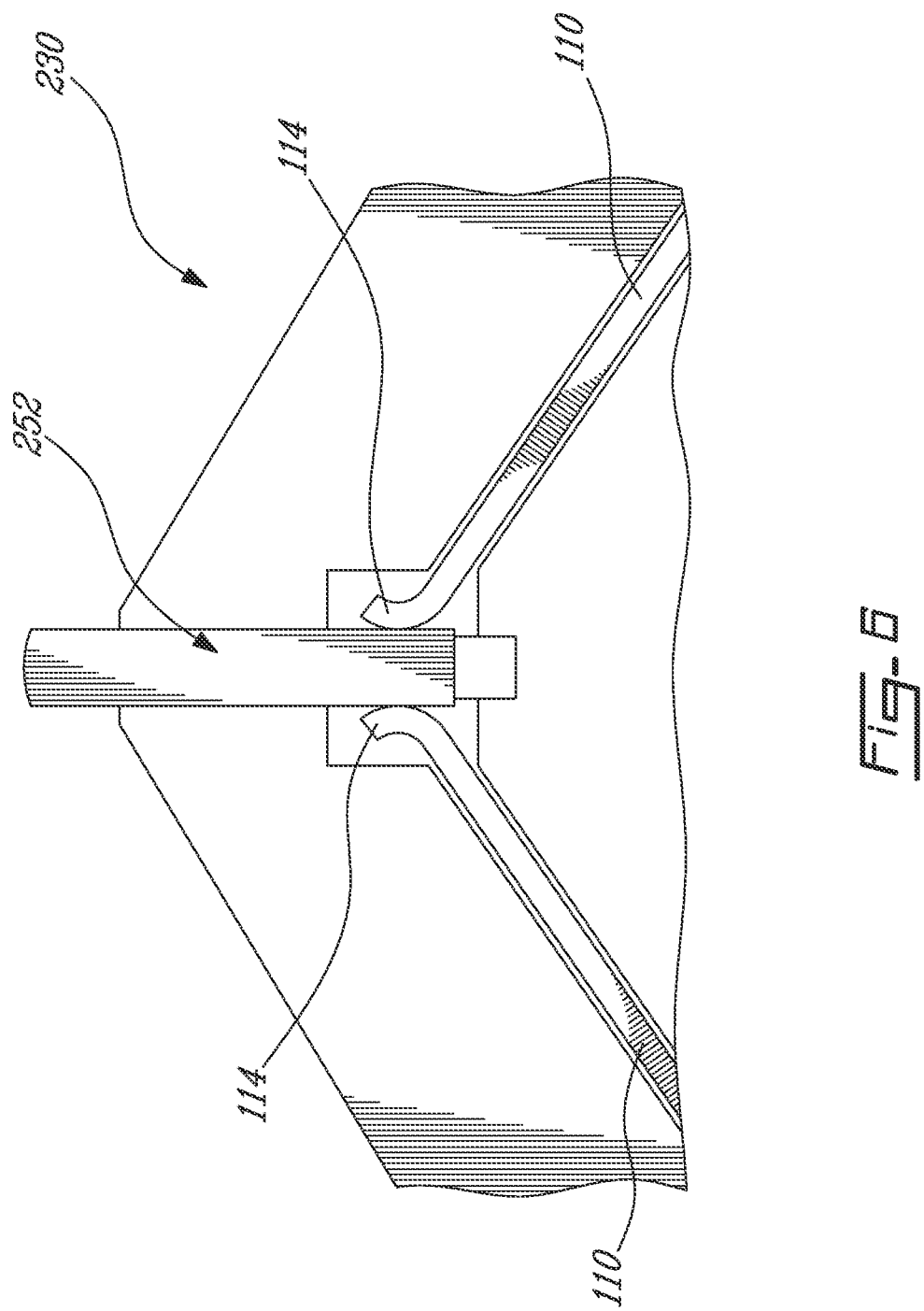
FIG. 6 is a schematic front view of an apex portion in accordance with an alternate embodiment.

Referring to FIG. 6, an apex seal assembly according to another embodiment is shown. Here the apex seal assembly includes a single apex seal provided at each of the apex portions 230. The single apex seal includes at least two portions or seal elements 252 which are biased away from one another such as to contact the opposite end walls 14 of the cavity. Similarly to the previously described embodiment, the curved end 114 of the two face seals 110 extending into each apex portion 230 abut the corresponding sealing element or portion of the apex seal 252 on opposites sides thereof, such as to cooperate to limit fluid communication along the end walls 14 and near the junction between each end wall 14 and the peripheral wall 18.

In another embodiment with is not shown, each apex seal assembly includes more than two circumferentially spaced apart apex seals, with at least one being biased against each of the end walls 14.

Referring to FIG. 7, an apex seal assembly according to a further embodiment is shown. The apex seal assembly at each of the apex portions 330 includes a single apex seal 352 protruding radially from the peripheral face 28, and first and second end seals 116 (only one of which is shown) respectively engaged to the first and second end of the apex seal 352, and biased against the respective end wall 14 through a suitable spring (not shown). The apex seal 352 can be monolithic or made of two or more cooperating portions or seal elements. Each end seal 116 is located in a cylindrical recess defined in the respective end face at the end of the apex seal groove, and has a radial slot 118 defined therein which receives the respective end of the apex seal 352. The curved end 114 of the two face seals 110 extending into each apex portion 330 abut the end seal 116 on opposites sides thereof such as to cooperate to limit fluid communication along the end walls 14 and near the junction between each end wall 14 and the peripheral wall 18. By contrast with the engagement of a straight end of a face seal in a corresponding slot of an end seal, the configuration shown may reduce twisting moment on the end seals, which may help in reducing the risk of damaging the apex seals, particularly for ceramic apex seals.

The above description is meant to be exemplary only, and one skilled in the art will recognize that changes may be made to the embodiments described without departing from the scope of the invention disclosed. For example, the biasing members need not be springs, per se, but rather any suitable apparatus having the functions described. The configuration of the springs shown are but one example of many possible configurations having the function(s) described. The multiple apex seals at each apex and/or seal elements forming part of the apex seal assembly need not be identically configured, but may have any suitable individual configuration. Therefore, modifications which fall within the scope of the present invention will be apparent to those skilled in the art, in light of a review of this disclosure, and such modifications are intended to fall within the appended claims.

The invention claimed is:

1. A rotor for a rotary internal combustion engine comprising:
   a body having first and second axially spaced apart end faces, and a peripheral face extending between the end faces and defining at least three circumferentially spaced apex portions, the first and second end faces each having a groove defined therein between each of the apex portions and each adjacent one of the apex portions, the grooves of the first and second end faces being disposed adjacent to and radially inwardly of the peripheral face of the rotor;
   at each of the apex portions:
      an apex seal protruding radially from the peripheral face of the body and being biased radially away therefrom, and
      first and second end seals received in a corresponding recess defined in the first and second end face, respectively, the first end seal protruding axially from the first end face and being biased axially outwardly away therefrom, and the second end seal protruding axially from the second end face and being biased axially outwardly away therefrom, the apex seal having ends received in a radial slot defined in the first and second end seals;
   a first face seal located in each groove of the first end face and extending between adjacent ones of the apex portions, each first face seal being biased axially outwardly away from the first end face, each first face seal having opposed curled ends each abutting the first end seal of a respective one of the adjacent apex portions; and
   a second face seal located in each groove of the second end face and extending between adjacent ones of the apex portions, each second face seal being biased axially outwardly away from the second end face, each second face seal having opposed curled ends each abutting the second end seal of a respective one of the adjacent apex portions.

2. The rotor as defined in claim 1, wherein for each of the apex portions, the apex seal includes first and second apex seal elements protruding radially from the peripheral face of the body and being biased radially away therefrom, the first apex seal element protruding axially from the first end face and biased axially outwardly away therefrom, the second apex seal element protruding axially from the second end face and biased axially outwardly away therefrom.

3. The rotor as defined in claim 1, wherein the curled ends of the first and second face seals are curved radially outwardly.

4. The rotor as defined in claim 1, wherein each of the curled ends abuts the respective end seal without contact between an extremity of the curled end and the respective one of the end seals.

5. The rotor as defined in claim 1, wherein the apex seals are made of ceramic and the face seals are made of metal.

6. The rotor as defined in claim 1, wherein the at least three circumferentially spaced apex portions include only three apex portions.

7. A rotary internal combustion engine comprising:
   a stator body having an internal cavity defined by axially spaced apart end walls and an inner surface extending between the end walls, the cavity having an epitrochoid shape defining at least two lobes;
   a rotor body having two axially spaced apart end faces each extending in proximity of a respective one of the end walls of the stator body, and a peripheral face extending between the end faces and defining a number of circumferentially spaced apex portions which is one more than a number of the lobes of the cavity, the rotor body being engaged to an eccentric shaft to rotate within the cavity with each of the apex portions remaining in proximity of the inner surface of the cavity;

at each of the apex portions:
  an apex seal protruding radially from the peripheral face of the body and being radially biased against the inner surface of the cavity, and
  first and second end seals received in a corresponding recess defined in the first and second end face, respectively, the first end seal being axially biased against the first end wall, and the second end seal being axially biased against the second end wall, the apex seal having ends received in a radial slot defined in the first and second end seals;
a first face seal extending from each of the apex portions to each adjacent one of the apex portions, each first face seal extending from the first end face adjacent to and radially inwardly of the peripheral face of the rotor and being axially biased against the first end wall, each first face seal having opposed curled ends each abutting the first end seal of a respective one of the apex portions; and
a second face seal extending from each of the apex portions to each adjacent one of the apex portions, each second face seal extending from the second end face adjacent to and radially inwardly of the peripheral face of the rotor and being axially biased against the second end wall, each second face seal having opposed curled ends each abutting the second end seal of a respective one of the apex portions.

8. The engine as defined in claim 7, wherein for each of the apex portions, the apex seal includes first and second apex seal elements protruding radially from the peripheral face of the rotor body, the first and second apex seal elements being radially biased against the inner surface of the cavity, the first apex seal element being axially biased against the first end wall, and the second apex seal element being axially biased against the second end wall.

9. The engine as defined in claim 7, wherein the curled ends of the first and second face seals are curved radially outwardly.

10. The engine as defined in claim 7, wherein each of the curled ends abuts the respective end seal without contact between an extremity of the curled end and the respective one of the end seals.

11. The engine as defined in claim 7, wherein the apex seals are made of ceramic and the face seals are made of metal.

12. The engine as defined in claim 7, wherein the number of the circumferentially spaced apex portions is 3 and the number of the lobes of the cavity is 2.

13. A method of sealing chambers of a Wankel engine defined between a rotor cavity and a rotor thereof, the cavity having axially spaced apart first and second end walls and a peripheral wall extending between the end walls, and the rotor having two axially spaced apart first and second end faces and a peripheral face extending between the end faces and defining circumferentially spaced apex portions, the method comprising:
  at each one of the apex portions, radially pushing at least a portion of an apex seal against the peripheral wall;
  between each adjacent ones of the apex portions, axially pushing a first face seal extending from the first end face against the first end wall;
  between each adjacent ones of the apex portions, axially pushing a second face seal extending from the second end face against the second end wall;
  at each one of the apex portions, axially pushing a first end seal having a first slot receiving a first end of the apex seal and extending from the first end face against the first end wall, abutting a curled end of an adjacent one of the first face seals with the first end seal, and abutting a curled end of another adjacent one of the first face seals with the first end seal; and
  at each one of the apex portions, axially pushing a second end seal having a second slot receiving a second end of the apex seal and extending from the second end face against the second end wall, abutting a curled end of an adjacent one of the second face seals with the end seal, and abutting a curled end of another adjacent one of the second face seals with the second end seal.

\* \* \* \* \*